United States Patent [19]

Ishigaki et al.

[11] E Re. 29,975

[45] Reissued Apr. 24, 1979

[54] MAGNETIC RECORDING AND/OR REPRODUCING SYSTEM

[75] Inventors: Yoshio Ishigaki, Tokyo; Hisaaki Narahara, Musashino; Takao Tsuchiya, Fujisawa, all of Japan

[73] Assignee: Sony Corporation, Tokyo, Japan

[21] Appl. No.: 754,982

[22] Filed: Dec. 28, 1976

Related U.S. Patent Documents

Reissue of:

[64] Patent No.: 3,925,810
Issued: Dec. 9, 1975
Appl. No.: 542,697
Filed: Jan. 21, 1975

[30] Foreign Application Priority Data

Jan. 21, 1974 [JP] Japan ..... 49-9160

[51] Int. Cl.[2] ..... H04N 5/78
[52] U.S. Cl. ..... 358/4; 358/8
[58] Field of Search ..... 358/4, 8, 11, 16; 360/33, 18

[56] References Cited

U.S. PATENT DOCUMENTS 3,821,787 6/1974 Kihara ..... 358/4

*Primary Examiner*—Robert L. Richardson
*Attorney, Agent, or Firm*—Lewis H. Eslinger; Alvin Sinderbrand

[57] ABSTRACT

In reducing crosstalk between the low frequency, frequency-converted chrominance portions of h-aligned video signals on adjacent tracks, the frequency converting carrier, but not the entire frequency converted portion, has its polarity inverted at the end of each line interval during the recording of alternate tracks but not during the recording of the remaining alternate tracks. This eliminates the extraneous signal that would otherwise be produced in the balanced modulator of the playback apparatus by any direct voltage offset or transient remanent of a direct voltage offset in the recorded signal.

14 Claims, 20 Drawing Figures

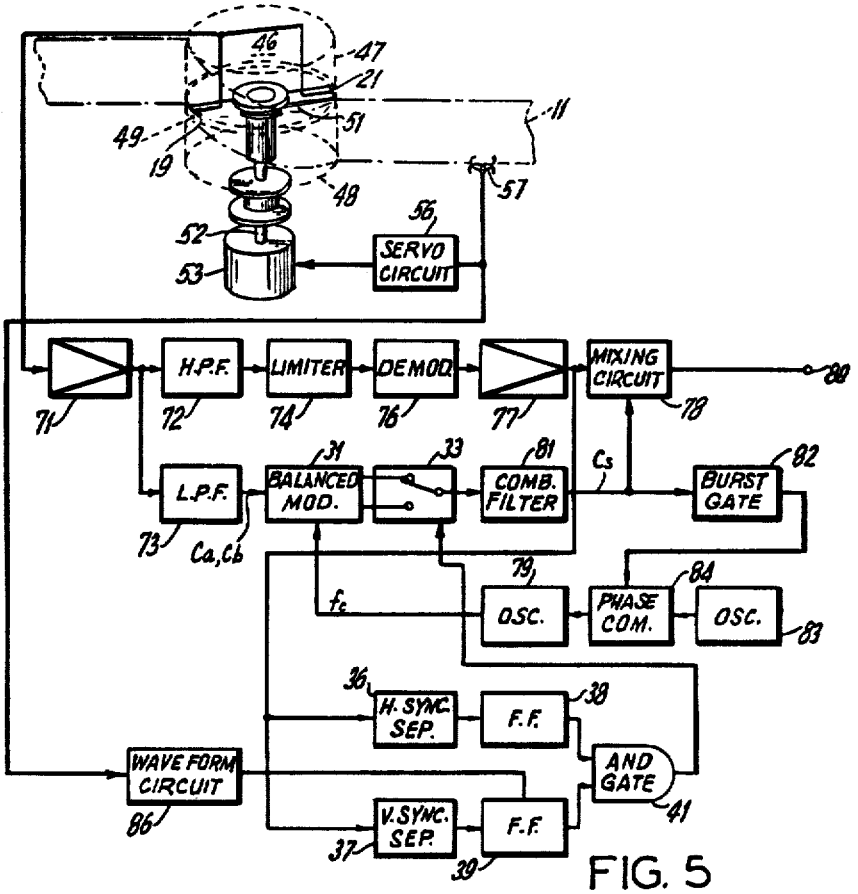
FIG. 5
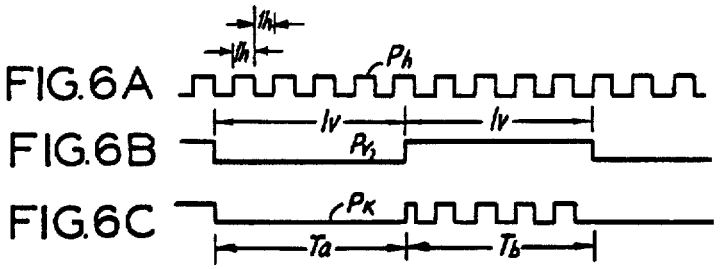

MAGNETIC RECORDING AND/OR REPRODUCING SYSTEM

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the field of magnetic recording and reproducing systems for video signals and particularly to the type of system in which there is a polarity reversal of a certain portion of the signal at the end of each line interval of certain groups of line intervals.

2. The Prior Art

This system is related to the system described in copending U.S. application Ser. No. 492,330, filed July 26, 1974, and assigned to the assignee of the present application. In that system it was proposed to reduce the crosstalk interference of the low frequency portions of the video signals recorded on adjacent tacks in h-alignment by reversing the polarity of the chrominance components at the end of each line interval of alternate tracks but not to reverse the polarity at the end of line intervals during the remaining alternate tracks. As a result, the crosstalk component picked up during playback of each line interval would have a polarity that was either the same as or opposed to the polarity of the main, or desired, chrominance component signal. The chrominance components and cross-talk signals of successive line intervals were then combined in a comb filter, which is a type of filter that includes delay means and a subtractor circuit to combine, in opposite polarity, the signal applied to the delay means with the output signal of the delay means. The length of the delay is one line interval and so the chromiance signal for each line interval is combined in opposite polarity with the chrominance signal of the succeeding line interval. During the recording of alternate tracks the chrominance components of successive line intervals are recorded in opposite polarity so that when they are combined subtractively, the alternation in polarity cancels out and the chrominance components of successive line intervals then return to the same polarity and are added. However, the cross-talk signals, when passed through this same comb filter emerge in successively opposite polarities and so are cancelled out or, at least, are reduced.

For those tracks in which the successive line intervals of the chrominance signal are not reversed in polarity, switching means are provided in the playback apparatus to select, during alternate line intervals, chrominance components of opposite polarity so that, as applied to the comb filter, they do have the required successive opposite polarity condition. Again, the crosstalk signals reproduced along the desired chrominance signals of the latter tracks are affected by the same switching and comb filter arrangement so that they are cancelled or are at least substantially minimized.

The comb filter not only provides means for combining successive line interval signals, but also has a filtering effect that results in the substantially complete attenuation of signals having integral multiples of the fundamental frequency that is delayed by one cycle in passing through the delay means. In the case of delay means having a delay of one line interval, thus fundamental frequency is the basic line repetition frequency of the system.

The effect of inverting the polarity of chrominance components during successive line intervals is to produce a frequency offset. In the simplest terms, if a sine wave signal having the frequency $f_s$ of the chrominance signal carrier were periodically inverted at a repetition frequency $f_h$, which may conveniently be understood to be the basic line repetition frequency, the resultant modified signal would not have the frequency $f_s$ any more but, by Fourier analysis, would be seen to be the combination of sinusoidal signals having frequencies $f_s+\frac{1}{2}(f_h)$ and $f_s-\frac{1}{2}(f_h)$. By choosing the frequency $f_s$ to be $nf_h+\frac{1}{2}(f_h)$ where n is an integral number, the signal having the frequency $f_s$ could pass through the comb filter, but the signals having the frequencies $f_s\pm\frac{1}{2}(f_h)$ would not pass through the comb filter. This provides further separation of the desired signals, which may be the $f_s$ signal and its side bands spaced from it by $mf_h$, from the undesired signals, which have frequencies $f_s\pm\frac{1}{2}(f_h)$ with side bands spaced $mf_h$ therefrom. The number m is an integer and usually is much smaller than n. The side bands of the desired signal interleave with side bands of the undesired, or crosstalk, signal and are all at frequencies to be separated from the undesired signal and its side bands by the frequency response of the comb filter as well as by the subtractive combination of successive line interval signals in the comb filter.

The circuit that achieves the desired switching of polarity of alternate line interval signals of the chrominance signal in the above-mentioned prior application may inadvertently and undesirably introduce a voltage offset. This is due to the fact that the signal of one polarity may have a certain DC axis and the signal of the other polarity may have a different axis so that when alternate line interval segments of these two signals are combined, the DC axes come through the switching operation as a square wave having a voltage magnitude equal to the difference in the DC axes. Even if the switched signal is passed through a filter to remove DC components, switching transients are still likely to remain. For example, if the filter is simply a series capacitor, the leading edge of the square wave component will pass through unattenuated and the level portion of the square wave component will decrease exponentially in each cycle. The difficulty of removing the undesired components, or transient remanents, by filtering is increased due to the fact that the chrominance components are typically converted to a frequency band of about 687 KHz, but their bandwidth is such that they extend ±500 KHz from the 687 KHz figure. Thus the filter would have to eliminate DC signals but pass all signals between approximately 187 KHz and 1,187 MHz.

It is one of the objects of the present invention to provide an improved system for eliminating the direct voltage offset in a system generally of the foregoing type.

Further objects will be apparent from the following specification together with the drawings.

SUMMARY OF THE INVENTION

According to the present invention, the entire chromimance component signal is not subjected to polarity inversion during alternate line intervals. Instead, only the carrier has its polarity inverted. The polarity is inverted during selected line intervals before being used to convert the frequency of the original chrominance component signal from the relatively high chrominance sub-carrier frequency $f_s$ which, in the NTSC-system is about 3.58 MHz, to the relatively low frequency converted frequency of about 587 KHz.

In the playback portion of the system, which may be constructed separately from the recording portion or may be constructed as part of a combined recording and playback device, the polarity of the frequency reconverting carrier is inverted during selected line intervals to achieve the necessary reconversion of the chrominance components to their required relatively high frequency band around 3.58 MHz carrier.

BRIEF DESCRIPTION OF THE DRAWINGS

FIG. 5 is a block diagram of a prior art playback system for reproducing signals recorded by the apparatus in FIG. 3.

FIGS. 6A to 6C show waveforms used in the recording and playback apparatus in FIGS. 3 and 5.

DESCRIPTION OF THE PREFERRED EMBODIMENTS

Figure 1:
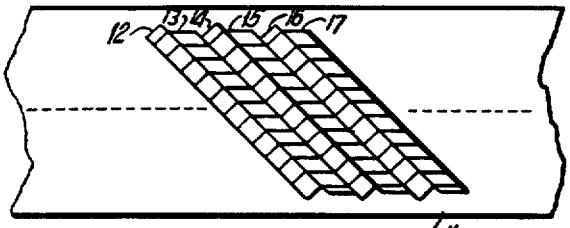
FIG. 1 is a simplified representation of a short section of magnetic tape showing the arrangement of recording of several tracks divided into line intervals in h-alignment.

The short length of tape 11 shown in FIG. 1 has six tracks 12–17 recorded on it. There tracks are shown as being recorded in abutting relationship, and the tracks are shown divided into small subsections, each of which represents the small area on which the entire video signal corresponding to one line of a complete television image is recorded. The smaller sections at the ends of the tracks represent half-line intervals for interlaced scanning.

The lines marking the ends of each of the subsections in each of the tracks 12–17 may be considered to represent the locations at which the horizontal synchronizing signals are recorded. The recording is said to be h-aligned since the horizontal signal, sometimes referred to as the h signals, are recorded in alignment with corresponding signals on adjacent tracks. This is a well-known technique for reducing the type of crosstalk that would otherwise occur between adjacent tracks if the recorded horizontal synchronizing signals were not aligned.

Figure 2A:
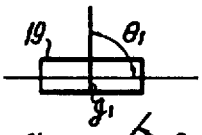
FIGS. 2A and 2B show the operative recording portion of two transducers for recording the tracks in FIG. 1.
Figure 2B:
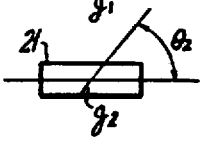

The lines representing the location of recording of the horizontal synchronizing signals in the tracks 12, 14, and 16 are represented as being perpendicular to the longitudinal direction of such tracks whereas the lines representing the location of recording of horizontal synchronizing signals in the tracks 13, 15, and 17 are at a different angle with respect to the longitudinal direction of those tracks. This difference in angle is produced by the air gap in the recording transducers as shown in FIGS. 2A and 2B. The air gap $g_1$ in the transducer 19 in FIG. 2A has an angle $\theta_1$ with respect to the line representing the direction of movement of the tape relative to the transducer 19. The angle $\theta_1$ is represented as a right angle and thus the tranducer 19 would be used to record the tracks 12, 14 and 16. The transducer 21 in FIG. 2B has an air gap $g_2$ at an angle $\theta_2$ with respect to the line representing the direction of relative movement between the tape and the transducer. The transducer 21 is the one that would be used to record the tracks 13, 15, and 17. The angles $\theta_1$ and $\theta_2$ are known as the azimuth angles, and it is not necessary that either of them be perpendicular to the direction of relative movement between the transducer and the tape.

The recording of information at different azimuth angles reduces cross talk between adjacent tracks not only from horizontal synchronizing signals but also from other signals. In order to pick up the highest frequency components recorded on a magnetic medium it is important that the azimuth angle of the reproducing transducer correspond exactly to the azimuth angle of the transducer used to record that information. Any discrepancy in the azimuth angles of the recording and reproducing transducers reduces the highest frequency signals that could otherwise be reproduced. Deliberately choosing widely different azimuth angles in recording adjacent tracks 12–17 in FIG. 1 substantially reduces any cross-talk from high frequency, and even medium frequency, components recorded on adjacent tracks. Only the cross-talk between relatively low frequency components remains a problem.

Figure 3:
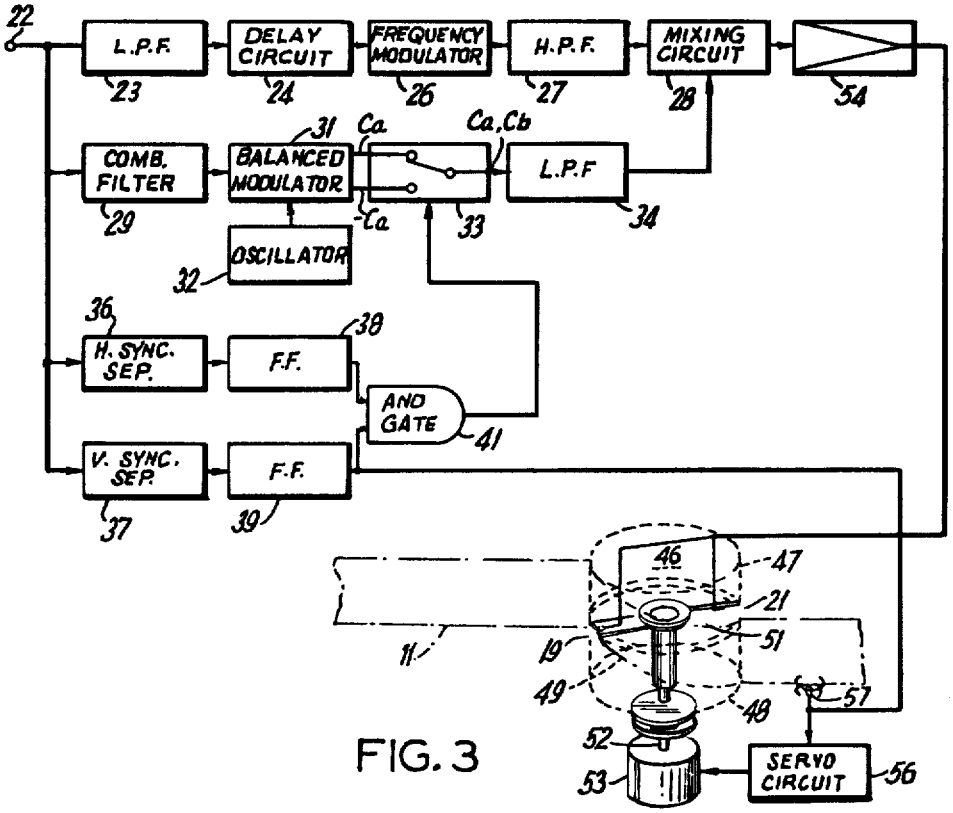
FIG. 3 is a block diagram of a prior art recording system in which the polarity of selected line intervals of the frequency converted chrominance signals are inverted.

The aforesaid prior application provided several techniques to reduce cross-talk of low frequency components between adjacent tracks, even though the tracks were recorded in abutting or even slightly overlapping relationship. FIG. 3 shows a block diagram of one type of recording apparatus described in the aforesaid prior application.

In FIG. 3 a composite video signal is applied to an input terminal 22. From there the signal branches out into four paths one of which leads to a low pass filter 23 that passes luminance signal components upto about 2.5 MHz or so. The output of the low pass filter is applied to a delay circuit 24 that equalizes the signal delay in other parts of the branched circuit. The luminance signal output of the delay circuit 24 is connected to a frequency modulator 26 to frequency modulate a carrier signal in accordance with standard video tape recording practice. The output signal of the frequency modulator is filtered by a high pass filter 27 and applied to a mixing circuit 28.

The composite video signal is also applied to a comb filter 29 which passes the chrominance signal components to a balanced modulator 31. An oscillator 32 is also connected to the balanced modulator 31. The modulator 31 has two output terminals connected to the fixed terminals of a single-pole double-throw switch, or selecting device 33 and the arm of this switch is connected to a low pass filter 34 which is connected, in turn, to the mixer 28.

The composite video signal is also supplied from the input terminal 22 to a horizontal synchronizing, or sync, signal separator 36 and to a vertical sync signal separator 37. The horizontal sync separator 36 is connected to a flip-flop 38 and the vertical sync separator 37 is connected to a flip-flop 39. Both of these flip-flops are connected to an AND gate 41 the output of which is connected to control the switching, or selecting, circuit 43. The flip-flop 39 is also connected to a servo-circuit 43 and to a control signal transducer 44 to record control signals along one edge of the tape 11.

The tape 11 wrapped helically part of the way around a drum 46. This drum comprises an upper portion 47 and a lower portion 48 with a slot 49 therebetween. The two transducers 19 and 21 are located at opposite ends of an arm 51 affixed to the end of a shaft 52 driven by a motor 53. The motor is controlled by the servo-circuit 43. An amplifier 54 connects the mixer 28 to the transducers 19 and 21. The recording apparatus also includes a servo-circuit 56 connected to the motor 53 to control the operation of the motor and connected to the output of the flip-flop 39 to be controlled by signals therefrom. The flip-flop 39 is also connected to a fixed transducer 57 to record the output pulses of the flip-flop along one edge of the tape 11 to serve as control pulses to govern the speed of the tape during playback.

In the operation of the apparatus shown in FIG. 3, the oscillator 32 generates a signal having a fixed frequency $f_c=f_s+f_a$, and this signal combines, in the balanced modulator 31, with the chrominance signal components that pass through the comb filter 29. The balanced modulator 31 subtracts the frequencies of the signals supplied thereto, produces two output signals indicated as $C_a$ and $-C_a$ which are of opposite polarity. Each of these signals has the same frequency converted carrier frequency $f_a$, when considered instantaneously, and they are selected alternately by the switching circuit 33 to be applied to the low pass filter 34 that eliminated undesired side bands and applies only the proper frequency converted chrominance component signal to the mixer 28.

The operation of the switching circuit 33 to select either signal $C_a$ or signal $-C_a$ is controlled by the AND gate 41 in response to output signals from the flip-flops 38 and 39. The selected pattern of recording of the signals $C_a$ and $-C_a$ is illustrated in FIG. 3 which shows a short length of the tape 11 with two adjacent tracks 58 and 59 recorded on it. The track 58 is shown with four line areas, or increments 61–64 and the track 59 is shown with four line areas, or increments, 66–69 h-aligned with the adjacent line areas 61–64 respectively, on the track 58. Each of the line areas 61–64 and 66–69 has two arrows in it, the larger of which indicates the polarity of the frequency converted chrominance component recorded therein, and the smaller of which indicates the polarity of the cross-talk interference signal, which is the frequency converted chrominance component signal in the next adjacent line area of the adjacent track.

All of the frequency converted chrominance component signals recorded on the track 58 have a carrier of the same polarity. This may be either the polarity of the signal $C_a$ or of the signal $-C_a$. For the sake of simplifying the explanation it will be assumed that the polarity of the larger arrows in the track 58 indicates that the signal $C_a$ is recorded in all of the line increments 61–64. In the track 59 the polarity of the signal is reversed in alternate line areas of increments, that is, in line areas 66 and 68, the signal $C_a$ is recorded and in line areas 67 and 69 the signal $-C_a$ is recorded. However, the effect of alternately switching back and forth between the signals $C_a$ and $-C_a$ is not as simple as it seems. As will be described hereinafter, the signal in the track 59 may be considered to be a new signal $C_b$ having frequency components offset with respect to the components of the signal $C_a$ (or $-C_a$) to interleave therewith.

In order to record the signals $C_a$ and $-C_a$ in the pattern set forth in FIG. 3, the simple logic circuit involving the AND gate 41 is used. FIG. 6A shows the output signal $P_h$ of the flip-flop 38 as being a square wave having high and low intervals, each having a duration of one line interval, or 1h. One complete cycle of the signal in FIG. 6A thus has a fundamental frequency $\frac{1}{2}(f_h)$. The output signal of the flip-flop 39 is shown in FIG. 6B as a square wave $P_v$ having high and low intervals each equal to 1v, where v is a field interval.

Since the AND gate 41 can produce a high output only when both of the applied signals $P_h$ and $P_v$ are high the output of the AND gate as is shown in FIG. 6C, remains low during one entire field interval $T_a$ and goes high only during alternate line intervals of the alternate field interval $T_b$. This is based on the assumption that each track records one complete field interval. The pattern shown in FIG. 3 corresponds to having the arm of the switching circuit 33 apply the signal $C_a$ to the low pass filter 34 when the output of the AND gate 41 is low and having the arm apply the signal $-C_a$ to the low pass filter 34 when the output of the AND gate 41 is high.

FIG. 5 shows a playback apparatus for reproducing video signals recorded by the apparatus of FIG. 3. Many of the components in FIG. 5 are identical with those in FIG. 3 and such identical components are indicated by the same reference numerals as in the earlier figures and descriptions of such elements. The description of their operation will not be unnecessarily repeated.

The reproduced signals from the transducers 19 and 21, which are also used in playing back recorded signals, are amplified in an amplifier 71 and are applied to a high pass filter 72 and a low pass filter 73. The high pass filter 72 passes the frequency modulated signal that includes the luminance components. This signal is limited in a limiter 74 and demodulated in a demodulator 76. The re-created luminance signal is then amplified in an amplifier 77 and applied to a mixer 78.

The frequency converted chrominance signal separated by the low pass filter 73 is applied to the balanced modulator 31 along with a signal from an oscillator 79. The signal from the oscillator 79 has a frequency $f_c=f_s+f_a$ and is constant during all line and field intervals. Two output terminals of the balanced modulator 31 are connected to the fixed terminals of the switching circuit 33, and the output of the latter is applied to a comb filter 81. The output of the comb filter is connected to the mixer 78 and to a burst gate 82. The burst gate and the output of an oscillator 83 are connected to a phase comparison circuit 84 that is connected to the oscillator 79. A waveform circuit 86, which may be a rectifier, is connected to the transducer 57 to receive reproduced control signals therefrom, and its output is connected to a resetting terminal of the flip-flop 39.

The operation of the system in FIG. 5, insofar as the chrominance component signal is concerned, consists in applying the signal having the frequency $f_c=f_s+f_a$ from the oscillator 79 to the balanced modulator 31 to convert the frequency $f_a$ of the signals $C_a$ and $C_b$, which are applied alternatively to the balanced modulator 31 back to the original chrominance carrier frequency $f_s$. The two output terminals of the balanced modulator 31 provide signals of opposite polarity. One of them includes the desired signals $C_{sa}$ and the undesired or cross-talk signal $C_{sb}'$, while the other includes the desired signal $-C_{sa}$ and the undesired or cross-talk signal $-C_{sb}'$. The designation $C_{sa}$ indicates that the carrier frequency of the frequency converted chrominance signal $C_a$ has been reconverted to the original frequency $f_s$. The designation $C_{sb}'$ indicates that the signal $C_b$, which consisted of alternate line intervals of the signals $C_a$ and $-C_a$ has been reconverted by the same converting signal having the frequency $f_c=f_s+f_a$.

The switching circuit 33 is controlled by the AND gate 41 to produce exactly the same switching pattern as is shown in FIG. 6C. The waveform circuit 86 assures that the operation of the flip-flop 39 in the playback unit properly relates to the operation of the flip-flop 39 in the recording system of FIG. 3.

Figure 4:
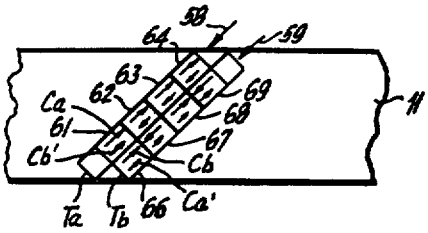
FIG. 4 is a simplified representation of a short section of magnetic tape illustrating the relationship between the polarities of the desired chrominance signals and crosstalk signals as recorded by the apparatus in FIG. 3.

The output of the switching circuit 33 is applied to the comb filter 81. It will be recalled that the comb filter includes both a direct signal and a path in which the signal is delayed by one horizontal line interval. The output of the direct path is combined in the delayed output of the other path. Thus, when the chrominance component signals of the track 58 in FIG. 4 are being reproduced, the desired reconverted chrominance component signals $C_{sa}$ corresponding to the signals $C_a$ indicated by the long arrows in two successive line areas 61 and 62 or 62 and 63 or 63 and 64 are combined, with the polarities of their carriers being the same, at the output of the comb filter. However, the undesired, or cross-talk, components $C_{sb}'$ corresponding to the signals $C_b'$ indicated by the small arrows in the line increments have carriers of opposite polarities in successive pairs of lines, and thus cancel each other when combined at the output of the comb filter 81. As a result, the output signal of the comb filter 81 in FIG. 5 during the reproduction of the track 58 consists substantially only of the desired chrominance components $C_s$ having the proper carrier frequency $f_s$. During the reproduction of the track 58, the switching circuit 33 does not switch back and forth between its two input terminals but remains on only one terminal as indicated during the interval $T_a$ in FIG. 6.

During the reproduction of the track 59, the switching circuit 33 does switch back and forth at the end of each line interval of time in accordance with the output signal of the AND gate 41 during the interval $T_b$ as indicated by the long arrows in line areas 66–69 in FIG. 4. The switching signal is indicated in FIG. 6C. Thus, the comb filter 81 receives the signals $C_{sb}$ and $C_{sa}'$ during group of line intervals recorded along the track 59.

Considering the signals on a line-by-line basis, since the chrominance signal components recorded in line areas 66 and 67 have opposite polarities, inversion of the signal reproduced from line area 67 causes the chrominance components signal to be combined, in phase, with the delayed chrominance component signal reproduced from line area 66 at the output of comb filter 81. However, since the chrominance component signals are recorded in all line areas of the next adjacent track 58 with carriers of the same polarity, the reconverted cross-talk signals $C_{sa}'$ from track 58, which are reproduced with the chrominance component signals recorded in the successive line areas of the track 59 also have the same polarity. Therefore, the abovementioned inverting of the signal reproduced from line area 67 of track 59 causes the cross-talk signal $C_a'$ reproduced with the signal recorded in line area 67 to be combined, with its phase or polarity reversed, with the delayed cross-talk signal reproduced with the signal recorded in line area 66, whereby the combined cross-talk signals cancel each other at the output of comb filter 81.

The reason why inversion of polarity of the signal $C_a$ at the end of each line interval changes the signal frequency may be explained by considering a simplified situation in which signals $C_a$ and $-C_a$, both of which have the carrier frequency $f_a$, are not modulated by chrominance components but are available at the two output terminals of the balanced modulator 31 in FIG. 3 as pure sine waves of opposite polarity. During the field interval $T_b$ when signals $C_a$ and $-C_a$ are selected alternately by the switching circuit 33, the output signal of the switching circuit is no longer a single signal but is a sine wave whose polarity reverses, or whose phase shifts 180°, at a repetition rate of $\frac{1}{2}(f_h)$. When a Fourier analysis is made of such a signal over a complete cycle of the interval of two horizontal lines, it will be found that the carrier frequency $f_a$ is no longer present, but has been replaced by first upper and lower side bands spaced by $\pm\frac{1}{2}(f_h)$ from the original carrier frequency and by additional upper and lower side bands spaced from the first mentioned side bands and from each other, in order, by $f_h$. Therefore, in effect, the signal-pole, doublethrow switching circuit 33 operates as a balanced modulator, and the modulating signal is the switching signal $P_k$ in FIG. 6C. During the interval $T_b$, this signal changes its level at a rate that takes two horizontal line intervals for a complete cycle and therefore has a frequency of $\frac{1}{2}(f_h)$. Being, in effect, a balanced modulator, the switching circuit 33 produces a balanced output signal without a carrier. This balanced output signal, since it interleaves with the signal $C_a$ may be referred to as the signal $C_b$, and thus there is, in fact, an interleaving relationship between the carriers of the frequency converted carrier components of the signal recorded on the track 58 and that recorded on the track 59 in FIG. 4. Such interleaving relationship provides for an interleaving relationship between the previously referred to cross-talk or interference signals $C_{sb}$ and $-C_{sb}$ and the desired signals $C_s$ which further improves the cancellation of the cross-talk signals.

Figure 7A:
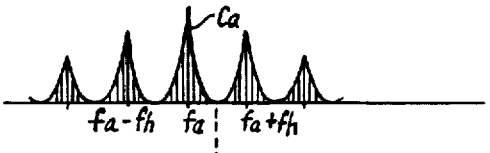
FIGS. 7A to 7G are a series of graphical representations of desired and undesired chrominance signals, illustating interleaving of the undesired signals with the desired signals.

FIGS. 7A to 7G show the interleaving frequency relationship of the chrominance signals in the circuits in FIGS. 3 and 5. FIG. 7A shows a portion of the spectrum of the frequency converted signal $C_a$ which comprises a central carrier frequency $f_a$ with principal harmonics spaced from it $\pm nf_h$ and with subsidiary harmonics spaced from the carrier frequency $f_a$ and from each of the principal harmonics by the field repetition frequency of the system. The signal $C_a$ is generated in the balanced modulator 31 in FIG. 3 during the recording of the track 58 in FIG. 4.

Figure 7B:
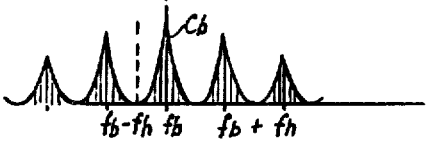

FIG. 7B shows a spectrum similar to that in FIG. 7A, except that its components are offset $\frac{1}{2}(f_h)$ with respect to the frequencies in FIG. 7A. The signal in FIG. 7B is the desired chrominance signal $C_b$ recorded in the track 59 in FIG. 4.

Figure 7C:
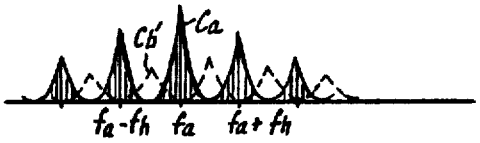
Figure 7D:
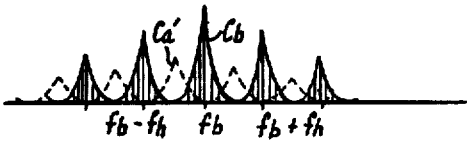

As indicated by the double arrows in each of the line interval areas in the tracks 58 and 59 in FIG. 4, each of the desired chrominance signals is unavoidably mixed with a cross-talk signal. These cross-talk signals are illustrated in the spectra in FIGS. 7C and 7D which correspond, respectively, to the spectra in FIGS. 7A and 7B. In FIG. 7C the cross-talk signal is actually an attenuated version of the signal $C_b$, and is therefore designated as $C_b$. In FIG. 7D the cross-talk signal is an attenuated version of the signal $C_a$, and is therefore designated as $C_a'$.

Figure 7E:
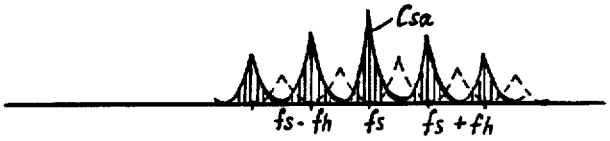
Figure 7F:
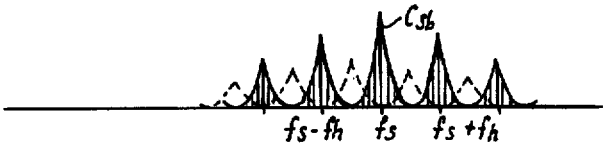
Figure 7G:
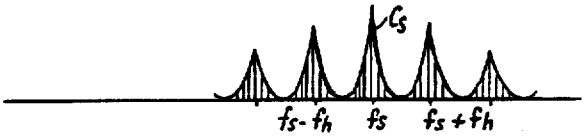

FIGS. 7E and 7F show the spectra of the chrominance signals at the output of the switching circuit 33 in FIG. 5. Although the signals $C_a$ and $C_b$ are converted in the balanced modulator 31 by the signal $f_c=f_s+f_a$ from the oscillator 79, and, as converted, are designated as signals $C_{sa}$ and $C_{sb}$, the fact that the arm of the switching circuit is held fixed in one position during the playback of the track 58 in FIG. 4 but is switched from one of its positions to the other at the end of each line interval during the playback of the track 59 in FIG. 4, results in eliminating the ½(h) offset of the signal $C_b$. Thus, the reconverted signals $C_{sa}$ and $C_{sb}$, both have the same carrier frequency $f_s$, which is the original chrominance sub-carrier frequency of the television system. In the spectra shown in FIGS. 7E and 7F the undesired cross-talk signals $C_{sa}'$ and $C_{sb}'$ spaced midway between the principal side bands of the desired signals $C_{sa}$ and $C_{sb}$ and can be eliminated by the comb filter 81 to yield the desired signal $C_s$, which is shown in FIG. 7G and is free of cross-talk components.

Figure 8A:
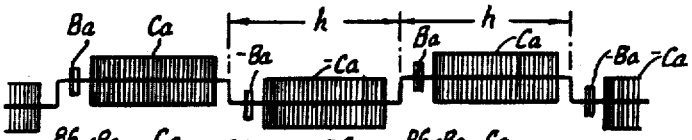
FIGS. 8A to 8C are a series of waveform diagrams illustrating the effect of direct voltage offset of the chrominance signals.
Figure 8B:
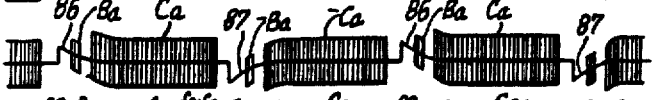
Figure 8C:
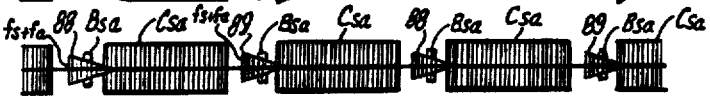

FIG. 8A shows the waveform of several line intervals of the chrominance signal $C_a$ and $-C_a$ and accompanying burst signal $B_a$ and $-B_a$ at the output of the switching circuit 33 in FIG. 3. There is a DC offset of alternate line interval signals due to the fact that the input terminals of the switching circuit 33 are connected to points in the circuit of the balanced modulator 31 that have different DC components. Although the DC offset is illustrated as if it were positive for the line intervals in which the signal $C_a$ is selected and relatively negative for the remaining line intervals when the signal $-C_a$ is selected, the polarity of the offset could be reversed. Passing the signal shown in FIG. 8A through the low pass filter 34 reduces the DC component and results in the signal shown in FIG. 8B. However, this signal still has an initial offset 86 or 87 at the beginning of each horizontal line interval when the switching of the circuit 33 takes place. When this signal with the offsets 86 and 87 is recorded on the tape 11 and is then played back by means of the circuit shown in FIG. 5, the carrier signal having the frequency $f_c$ is modulated in the balanced modulator 31 not only by the relatively high frequency chrominance components $\pm B_a$ and $\pm C_a$ of the frequency converted chrominance and burst signals, but also by the DC offset components 86 and 87. This is due to the fact that the balanced modulator 31 in FIG. 5 produces an output signal based on its carrier freqency $f_c$ whenever the input signal from the filter 73 differs from zero. As a result, the output signals of the balanced modulator 31 in FIG. 5 as shown in FIG. 8C not only have the frequency reconverted chrominance portions $C_{sa}$ during the visible part of each line interval and $B_{sa}$ during the bursts, but also have undesired signals 88 and 89 of the frequency $f_c=f_s+f_a$ and of amplitude determined by the remanent of DC offset 86 and 87 of the switching signal as recorded on the tape 11.

Figure 9:
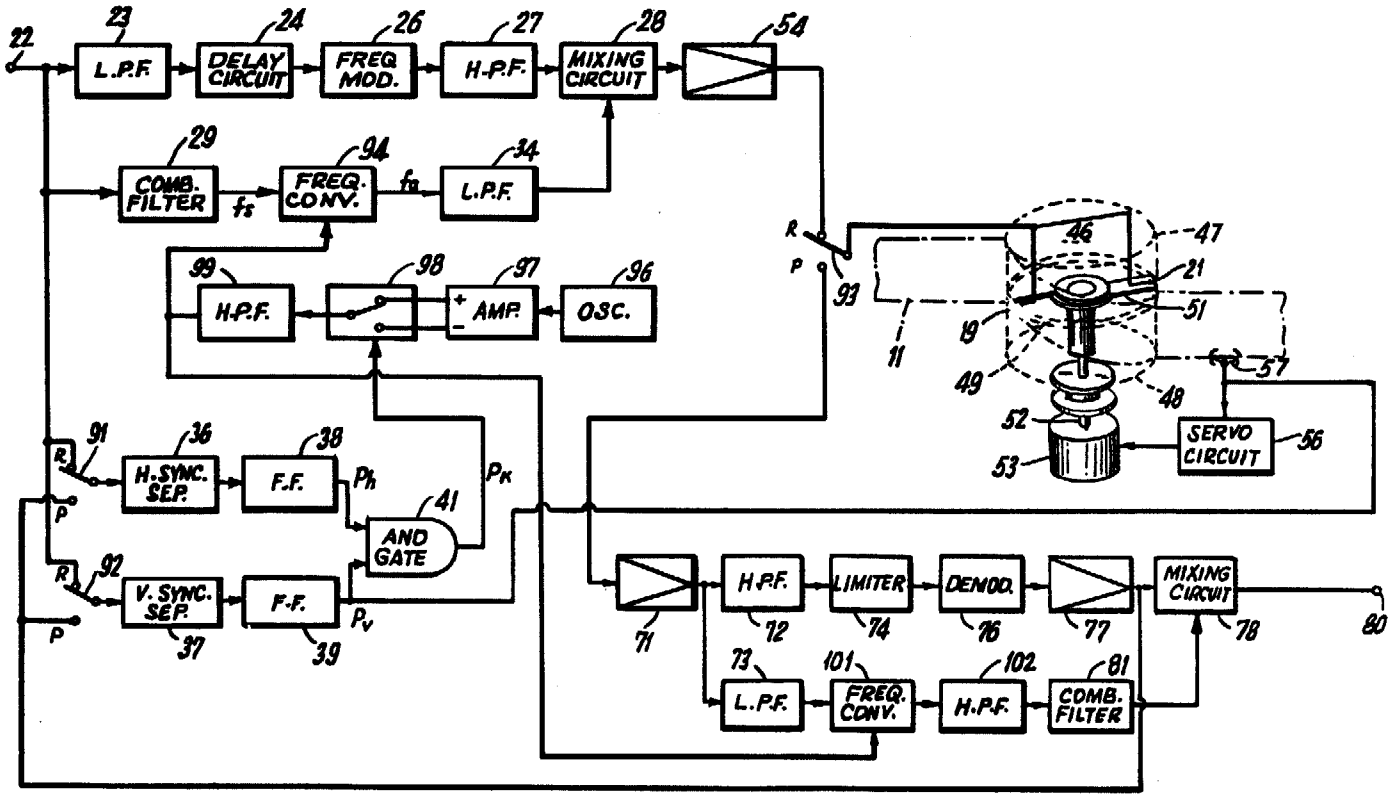
FIG. 9 is a block diagram showing both recording and reproducing apparatus constructed according to the present invention.

FIG. 9 shows an embodiment of the present invention including both recording and playback sections. The recording section includes many components found in the recording apparatus shown in FIG. 3 and the playback section includes some components found in the playback apparatus of FIG. 5. The description of these components and their operation will not be unnecessarily repeated.

Between the input terminal 22 and the horizontal and vertical synchronizing separators 36 and 37 are two double throw switches 91 and 92. The arm of another double throw switch 93 is connected to the transducers 19 and 21. The arm of each of the switches 91–93 makes contact either with a pole identified R or a pole identified P, depending upon whether the apparatus is to be used for recording or playback. In practice the arms of the three switches 91–93 would be mechanically linked together to operate as a three-pole double-throw switch.

The chrominance components of the video signal applied to the input terminal 22 to be recorded are separated out by the comb filter 19 and applied to a frequency converter 94. This frequency converter also receives signals that originate in an oscillator 96 and are amplified in a differential amplifier 97 that has two output terminals of opposite polarity. These output terminals are connected to two fixed terminals of a switching circuit 98, and the arm of the switching circuit is connected through a high pass filter 99 to the frequency converter 94. The output terminal of the AND gate 41 is connected to the actuating input terminal of the switching circuit 98.

In the playback section of the apparatus in FIG. 9, reproduced signals amplified by the amplifier 71 and filtered by the low pass filter 73 are connected to another frequency converter 101 that also receives signals from the high pass filter 99. The output of the frequency converter 101 is connected through a high pass filter 102 to the comb filter 81. In the operation of the apparatus of FIG. 9 the composite video signal applied to the input terminal 22 is separated by the low pass filter 23 and the comb filter 29 into luminance and chrominance components, respectively. The luminance components are applied to a frequency modulator 26 and the resulting frequency modulated signal is applied to the mixing circuit 28.

The chrominance components pass through the filter 29 and are applied to the frequency converter 94, have a carrier frequency $f_s$, which for NTSC signals, is approximately 3.58 MHz. The oscillator 96 produces a signal having a frequency $f_c=f_s+f_a$. This signal is amplified by the amplifier 97 and positive and negative polarity versions of this signal are passed, in a predetermined sequence, through the switching circuit 98. The resulting signal is filtered by the high pass filter 99 and applied to the carrier frequency input terminal of the frequency converter 94.

The sequence in which positive and negative versions of the signal having the freequency $f_c$ are passed through the switching circuit 98 is controlled by the output signal of the AND gate 41. This signal is shown in FIG. 6C. During the interval $T_a$ in FIG. 6C, the switching circuit 98 passes only one version of the signal, either the positive or the negative version. During the next interval $T_b$,, corresponding to the next recorded track on the tape 11, the switching circuit 98 would alternate back and forth between the positive and negative polarity signals. For the reason given previously, the resulting signal passed through the high pass filter 99 during the interval $T_b$ in FIG. 6C would not only reverse polarity at the end of each horiziontal line interval but would actually shift to a frequency relationship that would interleave with the basic frequency $f_c$ generated by the oscillator 96.

Contrary to the arrangement shown in FIG. 3 in which the entire chrominance signal is applied to the mixing circuit 28 in either positive or negative polarity, only the carrier signal is applied to the frequency converter 94 in either positive or negative polarity. It is relatively easy to eliminate any DC component of the signal of the output of the switching circuit 98 by means of the filter 99, and there is no DC offset produced in the frequency converter 94. However, there is still the desired reversal of polarity of the frequency converted carrier during certain intervals as determined by the switching operation depicted in FIG. 6C, and there is also the frequency interleaving relationship between components of the frequency converted signal produced during the interval $T_a$ in FIG. 6C and that produced during the interval $T_b$. As a result, all of the advantages heretofore described with respect to the recording apparatus shown in FIG. 3 are retained, but the disadvantage of having a DC offset is eliminated.

The resulting chrominance signal is combined in a mixing circuit 28 with the frequency modulated signal that includes luminance information, and the combined signal is passed through the switch 93 to be recorded by the transducers 19 and 21 on the tape 11.

During playback of information previously recorded on the tape 11, the arms of the switches 91–93 are transferred to their P terminals. This permits signals picked up by the trnsducers 19 and 21 to pass through the switch 93 to the amplifier 71 and be separated into high frequency and low frequency components. The high frequency components include the luminance information in frequency modulated form, and this information is extracted by the demodulator 76 and applied through the amplifier 77 to the mixing circuit 78.

The low frequency components that include the frequency converted chrominance signal pass through the low pass filter 73 to the frequency modulator 101. These components have a frequency converted carrier with a basic frequency $f_a$. The converting carrier from the high pass filter 99 applied to the frequency converter 101 has a frequency $f_c$, and the output of the frequency converter 101 thus has a carrier that is returned to the original sub-carrier frequency $f_s$. The chrominance components grouped around the carrier at the frequency $f_s$ are able to pass through the high pass filter 102, and the desired components are separated from the cross-talk components by the comb filter 101 in exactly the same way that the desired components and the cross-talk components are separated in the circuit shown in FIG. 5. Since there is no DC offset in the recorded signal, the signals 88 and 89 shown in FIG. 8C are not produced, and the reproduced composite signal at the output terminal 80 is free of this undesired interference.

The invention has been described in specific terms but it will be understood by those skilled in the art that modifications may be made therein. One such modification would be to derive the signal $P_v$ shown in FIG. 6B from a transducer associated with the rotating shaft 52. Such transducers are known, and in this instance, the use of a signal $P_v$ derived therefrom would have the advantage of causing the intervals $T_a$ and $T_b$ in FIG. 6C to correspond exactly to the rotation of the shaft 52. Still further modifications may be made in the invention within the scope of the following claims.

What is claimed is:

1. Apparatus in which video signals are recorded in h-alignment in adjacent tracks on a recording medium, said apparatus comprising:

A. means for generating a frequency converting carrier signal in first and second versions of opposite polarity;

B. a frequency converter to receive chrominance components of said video signals; and C. means to apply said first and second versions of said carrier signal in a predetermined sequence to said frequency converter, said sequence being such that, during alternate tracks, only one of said versions is applied and, during the remaining alternate tracks, said first and second versions are applied alternately in successive line intervals.

2. The apparatus of claim 1 in which said carrier generating means comprises:

A. an oscillator to generate said carrier signal;

B. a double-throw switching circuit comprising first and second input terminals connected to receive said first and second versions of said carrier signal, said switching circuit comprising an output terminal that can be conductively connected to said first and second input terminals alternately; and C. a filter connecting said output terminal of said switching circuit to said frequency converter.

3. The apparatus of claim 1 comprising:

A. a low pass filter connected to said frequency converter; and

B. transducer means connected to said filter to record the frequency converted signals on said recording medium.

4. The apparatus of claim 3 comprising:

A. a second frequency converter a connected to said means to apply said carrier signal, whereby said second converter receives said first and second versions in said predetermined sequence;

B. switching means to connect said transducer means alternatively to receive frequency converted signals from said first-named frequency converter and to supply reproduced signals from said recording medium to said second frequency converter; and C. a comb filter connected to said second frequency converter to filter interleaved cross-talk components from desired, frequency converted chrominance signals of opposite polarity.

5. The apparatus of claim 1 comprising:

A. reproducing transducer means to play back information recorded on said recording medium; and B. a comb filter connected to said frequency converter to filter interleaved cross-talk components from desired, frequency converted chrominance signals of opposite polarity.

*6. Apparatus in which video signals are recorded in adjacent tracks on a recording medium, said apparatus comprising:*

*A. means for generating a frequency converting carrier signal in first and second versions of opposite polarity;*

*B. a frequency converter to receive chrominance components of said video signals; and*

*C. means to apply said first and second versions of said carrier signal in a predetermined sequence to said frequency converter, said sequence being such that, during alternate tracks, only one of said versions is applied and, during remaining alternate tracks, said*

*first and second versions are applied alternately in successive line intervals.*

*7. Apparatus for reproducing video signals that have been recorded in adjacent tracks on a recording medium with a carrier having one set of phase conditions line interval by line interval in alternate tracks and a different set of phase conditions line interval by line interval in the remaining alternate tracks, the phase conditions of carriers of the signals recorded in adjacent tracks being such as to create predetermined cross-talk relationships during reproduction, said apparatus comprising:*

*A. means to reproduce the signals recorded on each track and cross-talk signals from adjacent tracks;*

*B. means to shift the carrier frequency and phase condition of the reproduced signals for a line interval at a time; and*

*C. means to combine the resultant reproduced and revised signals and cross-talk signals with the reproduced and revised cross-talk signals of the next successive line interval to reduce the amplitude of said cross-talk signals.*

*8. The apparatus of claim 7 in which said means to combine comprises a comb filter that comprises an input terminal, an output terminal, and parallel signal paths joining said input terminal to said output terminal, one of said paths comprising delay means to delay the passage of signals therethrough by a period of time equal to one horizontal line interval.*

*9. Apparatus for recording video signals in adjacent tracks on a recording medium and for playing back the recorded signals, said apparatus comprising:*

*A. means for generating a frequency converting carrier signal in first and second versions of opposite polarity;*

*B. a frequency converter to receive chrominance components of said video signals;*

*C. means to apply said first and second versions of said carrier signal to said frequency converter in a predetermined sequence such that, during the recording of alternate ones of said tracks, only one of said versions is utilized to frequency convert said chrominance components and, during the remaining alternate tracks, said first and second versions are utilized alternately for frequency converting successive line intervals;*

*D. means to record and reproduce said chrominance components line interval by line interval and track by track, said reproducing means also reproducing cross-talk chrominance signals from the next adjacent track;*

*E. means to reconvert the frequency of the reproduced carrier in the reproduced chrominance components by means of a carrier signal having the same frequency as said frequency converting carrier signal;*

*F. means to control the phase of said carrier applied to said frequency reconverter to correspond to said first and second versions of opposite polarity according to a predetermined sequence; and*

*G. a comb filter connected to the output of said frequency reconverter to filter out cross-talk components of the frequency reconverted signal.*

*10. Apparatus in which video signals are recorded in adjacent tracks on a recording medium, said apparatus comprising:*

*A. means for generating a frequency-converting carrier signal, the phase of which changes in a predetermined manner at predetermined line intervals;*

*B. a frequency converter to receive chrominance components of said video signals; and*

*C. means to apply said carrier signal to said frequency converter, the sequence of phase changes of said carrier signal being such that, during the recording of adjacent tracks, the relative phase of the carrier of the frequency converted signal has a predetermined relationship to the phase of the carrier of the adjacent recorded signal in the next adjacent track.*

*11. Apparatus in which video signals are recorded in adjacent tracks on a recording medium, said apparatus comprising:*

*A. means for generating a carrier signal the phase of which is changed in a predetermined manner at the end of certain horizontal line intervals;*

*B. means for changing the frequency and phase of chrominance components of said video signals in accordance with said carrier signal and to produce a frequency converted chrominance signal; and*

*C. frequency converter means for changing the frequency verted chrominance signal on said recording medium with a predetermined phase relationship to minimize interference during playback of said frequency converted chrominance signals recorded in adjacent tracks.*

*12. Apparatus in which video signals are recorded in adjacent tracks on a recording medium, said apparatus comprising:*

*A. a chrominance signal source for supplying a chrominance signal having a first carrier frequency;*

*B. a carrier signal source for supplying a carrier signal having a second frequency higher than said first frequency, the phase of said carrier signal being changed in a predetermined manner at the end of selected line intervals for cancellation of cross-talk between signals from adjacent tracks during reproduction of the recorded signals;*

*C. frequency converter means for chaing the frequency of said chrominance signal to a third frequency corresponding to the difference between said first frequency and said second frequency in response to said carrier signal; and*

*D. recording head means for recording the frequency changed chrominance signals in adjacent tracks on said recording medium.*

*13. Apparatus for reproducing chrominance signal recorded in adjacent tracks on a recording medium, the recorded chrominance signals on adjacent tracks having different phase conditions, said apparatus comprising:*

*A. means for reproducing said recorded chrominance signals;*

*B. means for generating a carrier signal the phase condition of which is changed in response to the phase condition of the chrominance signal being reproduced;*

*C. means for frequency converting the reproduced chrominance signal in accordance with said carrier signal;*

*D. comb filter means; and*

*E. means for supplying said frequency converted chrominance signal to said comb filter means.*

*14. Apparatus for recording video signals in adjacent tracks on a recording medium and for reproducing said signals, said apparatus comprising:*

*A. a chrominance signal source for supplying a chrominance signal having a first carrier frequency;*

*B. a carrier signal source for supplying a frequency converting carrier having a second frequency higher than said first frequency, the phase of said frequency converting carrier signal being changed in a predetermined manner at the end of selected line intervals;*

*C. frequency converter means for changing the frequency of said chrominance signal to a third frequency corresponding to the difference between said first frequency and said second frequency in response to said frequency converting carrier signal as changed;*

*D. means for recording the frequency changed chrominance signal in adjacent tracks on said recording medium and for reproducing said recorded frequency changed chrominance signal;*

*E. means for generating a frequency reconverting carrier signal at said second frequency, the phase of said reconverting carrier signal being changed at the end of selected line intervals in a manner determined by said changed frequency converting carrier signal to cancel cross-talk between signals from adjacent tracks during reproducing of the recorded signals; and*

*F. comb filter means connected to receive the frequency reconverted chrominance signal to reduce the amplitude of undesired cross-talk signals therefrom.*

* * * * *